United States Patent
Seyffert et al.

(10) Patent No.: US 11,614,346 B2
(45) Date of Patent: Mar. 28, 2023

(54) METHOD FOR MEASURING THE PULL-OUT OF THE BELT BAND AND BELT BAND RETRACTOR

(71) Applicant: ZF AUTOMOTIVE GERMANY GMBH, Alfdorf (DE)

(72) Inventors: Martin Seyffert, Pfullingen (DE); Karl Birk, Ebersbach (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 427 days.

(21) Appl. No.: 16/649,263

(22) PCT Filed: Sep. 24, 2018

(86) PCT No.: PCT/EP2018/075770
§ 371 (c)(1),
(2) Date: Mar. 20, 2020

(87) PCT Pub. No.: WO2019/063471
PCT Pub. Date: Apr. 4, 2019

(65) Prior Publication Data
US 2020/0292357 A1    Sep. 17, 2020

(30) Foreign Application Priority Data
Sep. 27, 2017 (DE) .......................... 102017122459.9

(51) Int. Cl.
*G01D 5/245* (2006.01)
*B60R 22/34* (2006.01)
*B60R 22/48* (2006.01)

(52) U.S. Cl.
CPC ............. *G01D 5/245* (2013.01); *B60R 22/34* (2013.01); *B60R 22/48* (2013.01); *B60R 2022/4825* (2013.01)

(58) Field of Classification Search
CPC ........................ B60R 2022/4825; G01D 5/245
See application file for complete search history.

(56) References Cited

U.S. PATENT DOCUMENTS

| | | | |
|---|---|---|---|
| 4,356,557 A | 10/1982 | Bell et al. | |
| 5,626,359 A | * 5/1997 | Steffens, Jr. | ...... B60R 21/01558 |
| | | | 280/735 |
| 6,290,160 B1 | 9/2001 | Strobel | |

(Continued)

FOREIGN PATENT DOCUMENTS

| | | | |
|---|---|---|---|
| DE | 10136267 | 2/2002 | |
| DE | 102005042307 A1 | * 3/2007 | ............. B60R 22/36 |

(Continued)

*Primary Examiner* — Paul N Dickson
*Assistant Examiner* — Matthew D Lee
(74) *Attorney, Agent, or Firm* — Tarolli, Sundheim, Covell & Tummino LLP

(57) ABSTRACT

A method for sensing the webbing extension of a seat belt (12) from a webbing retractor (10) of a vehicle includes sensing the position of the magnet (18) by means of the magnetic field sensor (20) by the control unit (22). The control unit (22) detects when the magnet (18) has completed a full turn. The control unit (22) deposits the number of the full turns in a memory (26). The control unit (22) determines the webbing extension by way of number of the full turns and the position of the magnet (18). A webbing retractor (10) for a seat belt (12) has a magnet (18).

15 Claims, 3 Drawing Sheets

(56) References Cited

U.S. PATENT DOCUMENTS

| | | |
|---|---|---|
| 7,891,596 B2 | 2/2011 | Holbein et al. |
| 2008/0012285 A1 | 1/2008 | Holbein et al. |
| 2008/0105777 A1* | 5/2008 | Holbein ................. B60R 22/46 |
| | | 242/379.1 |
| 2011/0278905 A1* | 11/2011 | Ikeda ..................... B60R 22/34 |
| | | 324/207.13 |
| 2012/0217955 A1 | 8/2012 | Petrie |
| 2016/0202084 A1 | 7/2016 | Li et al. |
| 2016/0280180 A1 | 9/2016 | Holbein |
| 2019/0061683 A1* | 2/2019 | Jessup .................... B60R 22/26 |
| 2019/0256040 A1* | 8/2019 | Romero Elizondo .. B60R 22/48 |

FOREIGN PATENT DOCUMENTS

| | | | |
|---|---|---|---|
| DE | 102017128031 A1 * | 5/2018 | ....... B60R 21/01548 |
| JP | 2007326513 | 12/2007 | |
| WO | WO-2007141977 A1 * | 12/2007 | ............. B60R 22/48 |

* cited by examiner

METHOD FOR MEASURING THE PULL-OUT OF THE BELT BAND AND BELT BAND RETRACTOR

RELATED APPLICATIONS

This application corresponds to PCT/EP2018/075770 filed Sep. 24, 2018, which claims the benefit of German Application No. 10 2017 122 459.9, filed Sep. 27, 2017, the subject matter of which are incorporated herein by reference in their entirety.

BACKGROUND OF THE INVENTION

The invention relates to a method for sensing the webbing extension of a seat belt from a webbing retractor of a vehicle as well as to a webbing retractor for a seat belt of a vehicle.

In modern vehicles the various safety systems of a vehicle are interlinked and exchange data. Said data also include the information about how far a seat belt has been extended. The length of the extended webbing is briefly referred to as webbing extension.

As a rule, for sensing the webbing extension magnetic field sensors which sense the position of a magnet coupled to the belt reel of the webbing retractor are utilized.

The rotation of the belt reel is reduced via a gear mechanism to a metering wheel so that the metering wheel performs one or less than one turn while the seat belt is completely wound off the belt reel. A magnet is mounted to said metering wheel in a rotationally fixed way so that the position of the metering wheel can be sensed by way of the magnetic field sensor.

By reason of the gear mechanism and the necessarily large diameter of the metering wheel, a large installation space is required for such webbing retractor, however.

SUMMARY OF THE INVENTION

Therefore, it is the object of the invention to provide a method for sensing the webbing extension as well as a webbing retractor for a seat belt which are adapted to sense the absolute webbing extension while little space is required.

The object is achieved by a method for sensing the webbing extension of a seat belt from a webbing retractor of a vehicle, the webbing retractor comprising a belt reel, at least one magnet rotatable along with the belt reel, a magnetic field sensor arranged in the magnetic field generated by the magnet and a control unit connected to the magnetic field sensor. The method includes the following steps:
 a) the position of the magnet is sensed by means of the magnetic field sensor by the control unit,
 b) the control unit detects when the magnet has completed a full turn,
 c) the control unit deposits the number of the full turns in a memory, and
 d) the control unit determines the webbing extension by way of the number of the full turns and the position of the magnet.

The control unit may be integrated in the magnetic field sensor, may be formed separately or may be part of a higher control unit. The magnet is connected to the belt reel, as a matter of course, such that it rotates when the belt reel is rotating. The magnet may be a permanent magnet or a solenoid, the magnetic field of the solenoid referring to the activated state of the solenoid.

As the control unit deposits the number of the full turns, i.e. a 360° turn from the zero position of the magnet, in a memory, the control unit can determine the absolute webbing extension even when the magnet performs several turns upon unwinding the seat belt. Therefore, it is not necessary to reduce the rotation of the belt reel so that the magnet performs maximally one turn. In this way, the metering wheel can be reduced in size or can be completely saved, thereby reducing the size of the entire webbing retractor.

The conversion of the completed full turns and the position of the magnet vis-à-vis its zero position to the length of the webbing extension is carried out by the control unit by way of a predetermined rule. In particular, said rule can take into account that, due to the diameter of the webbing reel varying along with the webbing extension on the belt reel, not each turn of the belt reel results in the same webbing extension.

Preferably, the control unit deposits the number of full turns in a non-volatile memory and/or the memory of the control unit is supplied with power even in the deactivated state of the vehicle. The supply may be carried out by a battery of the control unit. A deactivated state of the vehicle is understood to be, for example, a state in which the engine of the vehicle is stopped and/or the doors of the vehicle are locked. In this way, the absolute webbing extension can be determined even when the vehicle was deactivated for a longer period of time.

For example, in the deactivated state of the vehicle the control unit is operated in a stand-by mode with low power consumption in which the control unit continues detecting the position of the magnet, thereby allowing the service life of the control unit to be extended without changing the battery. Accordingly, the repetition rate of the detection can be reduced in the stand-by mode.

In order to determine the webbing extension always precisely, the control unit can be transferred from its stand-by mode to its operating mode when the position of the magnet changes so far that a predetermined threshold is exceeded.

Also, the control unit can be transferred from its stand-by mode to its operating mode when a predetermined action taken at the vehicle is detected such as unlocking the vehicle, opening a vehicle door or starting the engine. This ensures reliable operation of the control unit.

In one configuration of the invention, the value of the webbing extension is reset to zero when the control unit is disconnected from the vehicle power supply, whereby an initialization of the method is enabled. The value of the webbing extension thereafter can be checked for plausibility by known techniques.

In one embodiment of the invention, the control unit determines the position of the magnet with the seat belt being completely wound onto the belt reel and deposits said position of the magnet as zero position of the magnet in the memory. This helps to ensure the precision of sensing even over a long period of time.

Further, the object is achieved by a webbing retractor for a seat belt of a vehicle comprising a belt reel, at least one magnet, a magnetic field sensor disposed in the magnetic field generated by the magnet and a control unit connected to the magnetic field sensor. The magnet is connected to the belt reel such that it rotates when the belt reel is rotating, the control unit being configured to carry out the method according to the invention.

Preferably, the magnet is mounted on a front end of the belt reel, thus allowing the rotation of the belt reel to be directly detected.

In order to enable use of a simple and low-cost magnet, the magnet and/or the magnetic field sensor can be disposed on the axis of rotation of the belt reel.

For example, the magnet and/or the magnetic field sensor can be arranged to be offset against the axis of rotation of the belt reel to facilitate bearing of the belt reel. The magnet surrounds the bearing of the belt reel, for example.

In one configuration variant, the magnetic field sensor is arranged at the radial outside of the magnet so that installation space can be saved in the axial direction of the belt reel.

In one configuration of the invention, the webbing retractor includes a gearwheel engaged in a toothing of the belt reel, with the magnet being mounted on the gearwheel. For example, the magnet is mounted in the axis of rotation of the gearwheel. In this way, both the magnet and the bearing of the belt reel can be designed in a simple manner.

For increasing the accuracy of sensing, a gear mechanism may be provided between the gearwheel and the belt reel.

The magnetic field sensor may be an AMR sensor, a GMR sensor, a CMR sensor and/or a TMR sensor, thereby allowing reliable and precise sensors to be utilized. An AMR sensor is based on the anisotropic magnetoresistance effect (AMR effect), a GMR sensor is based on the giant magnetoresistance effect (GMR effect), a CMR sensor is based on the colossal magnetoresistance effect (CMR effect) and a TMR sensor is based on the tunnel magnetoresistance (TMR effect).

Likewise, the use of CVH sensor technology is possible. Accordingly, CVH stands for Circular Vertical Hall. This sensor technology is known, for example, from US20120217955 A1.

BRIEF DESCRIPTION OF THE DRAWINGS

Further features and advantages of the invention will be evident from the following description and from the attached drawings which are referred to, and wherein.

DESCRIPTION

Figure 1:
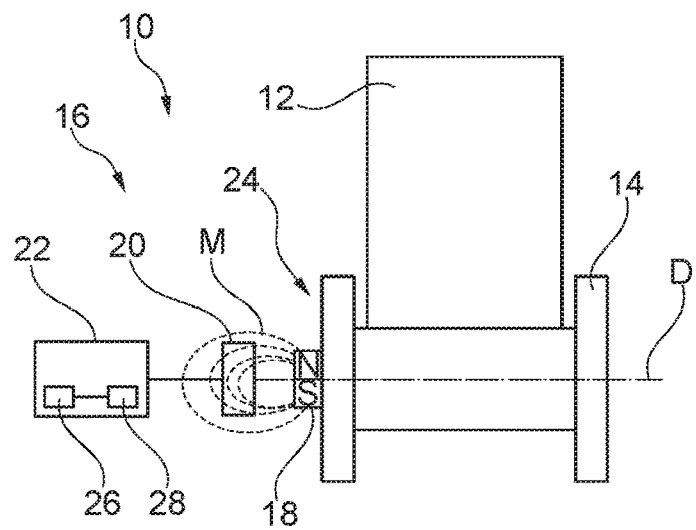
FIG. 1 shows a schematic view of a first embodiment of a webbing retractor according to the invention.

FIG. 1 illustrates a webbing retractor 10 comprising a seat belt 12, a belt reel 14 and a sensor device 16. The webbing retractor 10 is part of a seat belt system of a vehicle (not shown).

The belt reel 14 is rotatably supported about an axis of rotation D. The seat belt 12 is connected to the belt reel 14 at one of its ends so that it winds onto the belt reel 14 or unwinds from the belt reel 14, when the belt reel 14 rotates about its axis of rotation D.

The sensor device 16 includes a magnet 18, a magnetic field sensor 20 and a control unit 22.

In the first example embodiment shown, the magnet 18 is mounted on one of the front ends 24 of the belt reel 14 on the axis of rotation D. Therefore, the magnet 18 rotates when the belt reel 14 rotates about its axis of rotation D.

The magnet 18 may be a permanent magnet or a solenoid and generates a magnetic field indicated by the magnetic field lines M.

The magnetic field sensor 20 is arranged within said magnetic field. In the shown example embodiment, it is equally provided on the axis of rotation D.

The magnetic field sensor 20 may be an AMR sensor, a GMR sensor, a CMR sensor and/or a TMR sensor and detects the variation of the magnetic field produced by the magnet 18.

The magnetic field sensor 20 in turn is connected to the control unit 22.

The control unit 22 includes a memory 26 and a battery 28, the memory 26 being either a volatile memory or a non-volatile memory.

The battery 28 can supply power to the control unit 22, the magnetic field sensor 20 as well as the memory 26 so that the control unit 22 is not dependent on a power supply of the vehicle power supply (not shown).

However, it is also imaginable that the control unit 22 is supplied with power through the vehicle power supply and the battery 28 takes over the power supply only when the vehicle power supply is disconnected.

Moreover, the control unit 22 may be connected, in terms of information, i.e. via signal wires or wirelessly, to other units of the vehicle.

Figure 2:
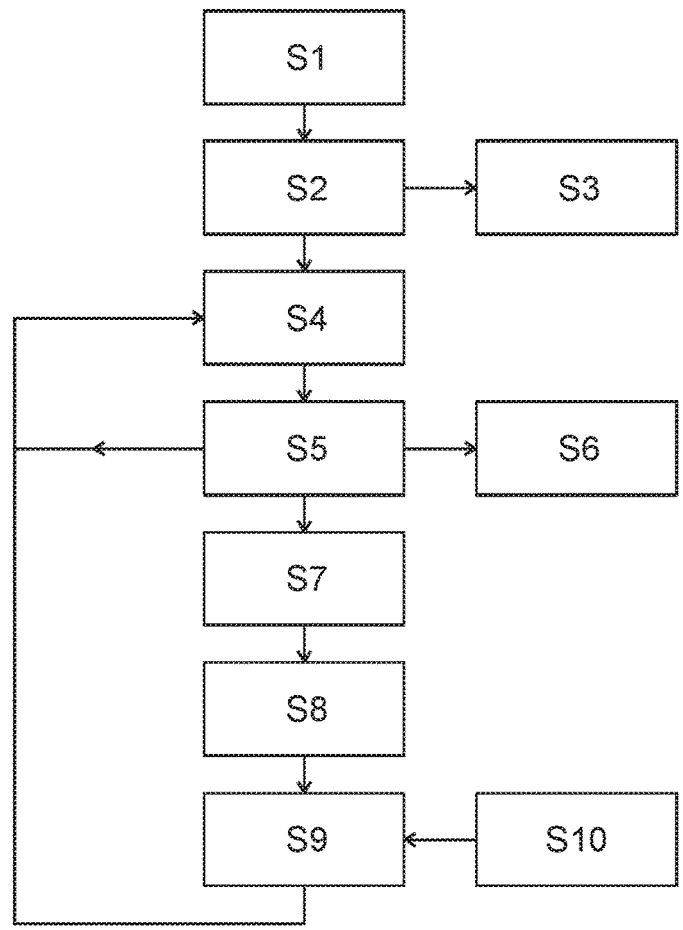
FIG. 2 shows a flow diagram of the method according to the invention.

The control unit 22 is configured to carry out the method shown in FIG. 2 for determining the absolute webbing extension and to then make available the established value of the webbing extension to the other units of the vehicle.

As soon as the control unit 22 is connected for the first time to the vehicle power supply or to other units of the vehicle, the value of the webbing extension is set to zero to initialize the method (step S1).

Said initialization, i.e. resetting the value of the webbing extension to zero, can be performed whenever the control unit 22 was disconnected from the vehicle power supply.

Subsequently, the control unit 22 determines the position of the magnet 18 with the aid of the magnetic field sensor 20 (step S2). This position is the home or zero position of the magnet 18, wherein the control unit 22 assumes that the seat belt 12 in this position is completely wound on the belt reel 14. Therefore, a webbing extension with the value "0" is assigned to said zero position.

The control unit 22 then can deposit the position of the magnet 18 in its zero position in the memory 26 (step S3).

The control unit 22 now is in its operating mode and can determine the webbing extension by repeatedly or continuously sensing the position of the magnet 18 by means of the magnetic field sensor 20 (step S4). To this effect, the control unit 22 can inquire the magnetic field sensor 20 at a particular repeat frequency.

When the seat belt 12 is unwound from the belt reel 14, the belt reel 14 rotates about its axis of rotation D, thus causing the magnet 18 to be rotated about the axis of rotation D to the same extent.

Accordingly, the seat belt 12 is unwound from the belt reel 14 during rotation of the belt reel 14 in the unwinding direction and is wound onto the belt reel 14 during rotation in the winding direction.

The rotation of the magnet 18 also causes the magnetic field generated by the latter to rotate. The variation and, resp., rotation of the magnetic field can be detected by the magnetic field sensor 20, thus allowing the control unit 22 to conclude the position of the magnet 18 and the direction of rotation thereof.

Accordingly, the control unit 22 can find whether the magnet 18 rotates in the unwinding direction or in the winding direction.

When the magnet 18 passes its zero position during rotation in the unwinding direction, the control unit 22 detects the magnet 18 having completed a full turn and e.g. increases an internal counter counting the full turns of the magnet 18 and thus of the belt reel 14 by one (step S5). Then the control unit 22 continues monitoring the position of the magnet 18 according to step S4.

If the magnet 18 once again passes its zero position in the unwinding direction, the control unit redetects a complete turn and again increases the counter of the full turns by one.

When the magnet 18 rotates in the opposite direction, viz. in the winding direction and, in so doing, passes its zero position, however, this, too, is recorded by the control unit 22 and the counter of the full turns is reduced by one.

In this way, the control unit 22 can precisely track the number of the full turns which the magnet 18 and thus also the belt reel 14 has completed.

Then the control unit 22 deposits the number of full turns, i.e. the value of the counter, in the memory 26 (step S6).

For example, the control unit 22 updates the value of the number of the full turns in the memory 26 each time when it changes the value of the counter. However, it is also imaginable that the control unit 22 transmits the value of the counter to the memory 26 at specific events only, for example when it leaves its operating mode.

By means of the number of full turns, i.e. the value of the counter, and the current position of the magnet 18 with respect to its zero position, the control unit 22 then can conclude the length of the seat belt 12 which is unwound from the belt reel 14, viz. the so-called webbing extension (step S7).

The length determined by the control unit 22 is also the absolute length of the webbing extension, as sensing was started when the seat belt 12 was completely wound on the belt reel 14.

If necessary, the webbing extension can be checked for plausibility by known techniques.

The webbing extension established in this way now can be transmitted by the control unit 22 to the remaining units of the safety system.

Thus, the control unit 22 can determine the absolute webbing extension at any time.

When the vehicle is deactivated now, for example when the respective ride of the vehicle is terminated, the information about the number of full turns as well as information about the position of the zero position of the magnet 18 remain in the memory 26.

For this purpose, either the memory 26 is a non-volatile memory or else power is permanently supplied to the memory 26 via the battery 28 even in the deactivated state of the vehicle.

When the vehicle is transformed to a deactivated state, the control unit 22 is put into a stand-by mode in a step S8.

The transition to a deactivated state of the vehicle can be considered, e.g., to be the point in time when the engine of the vehicle is stopped, but preferably when the vehicle is locked.

In the stand-by mode, the functions of the control unit 22 are reduced so far that the control unit 22 has a lower power consumption than in its operating mode. However, the control unit 22 monitors the position of the magnet 18 also in the stand-by mode. For example, the magnetic field sensor 20 is read out at a lower repeat rate to save power.

Upon transition to the stand-by mode at the latest, the control unit 22 deposits the number of the full turns and/or the position of the magnet 18 in its zero position in the memory 26.

Inversely, the control unit 22 changes from its stand-by mode to its operating mode for two different reasons, for example (step S9).

On the one hand, the control unit 22 returns to the operating mode when it has been detected that the position of the magnet 18 has changed so strongly that a predetermined threshold is exceeded. For example, the control unit 22 is put into the operating mode when the magnet 18 rotates by more than 5°.

On the other hand, the control unit 22 changes to its operating mode when a particular event occurs. This event may be a predetermined action taken at the vehicle such as unlocking the vehicle, opening a vehicle door or starting the engine. This puts the control unit 22 into the operating mode when the deactivated state of the vehicle is terminated to use the vehicle.

As soon as the control unit 22 returns to its operating mode, it reads in the number of full turns and the position of the magnet 18 at its zero position from the memory 26 (step S10).

Now the control unit 22 is prepared to permanently monitor the webbing extension again, and the process is continued by step S4.

By storing the information about the full turns and/or the zero position, even when the vehicle is not in use, the information about the absolute webbing extension is not lost.

This is important to determine the absolute webbing extension, as it cannot be assumed that each time the vehicle is stopped and, resp., locked, the seat belt 12 is completely wound onto the belt reel 14 so that a new sensing can be started from zero.

If the battery 28 has to be replaced or the webbing extension is falsely determined, the value of the webbing extension can be reset by disconnecting the control unit 22 from the vehicle power supply. In this way, the described process is restarted beginning from step S1. As a matter of course, it is also imaginable to trigger the initialization by different events.

Figure 3:
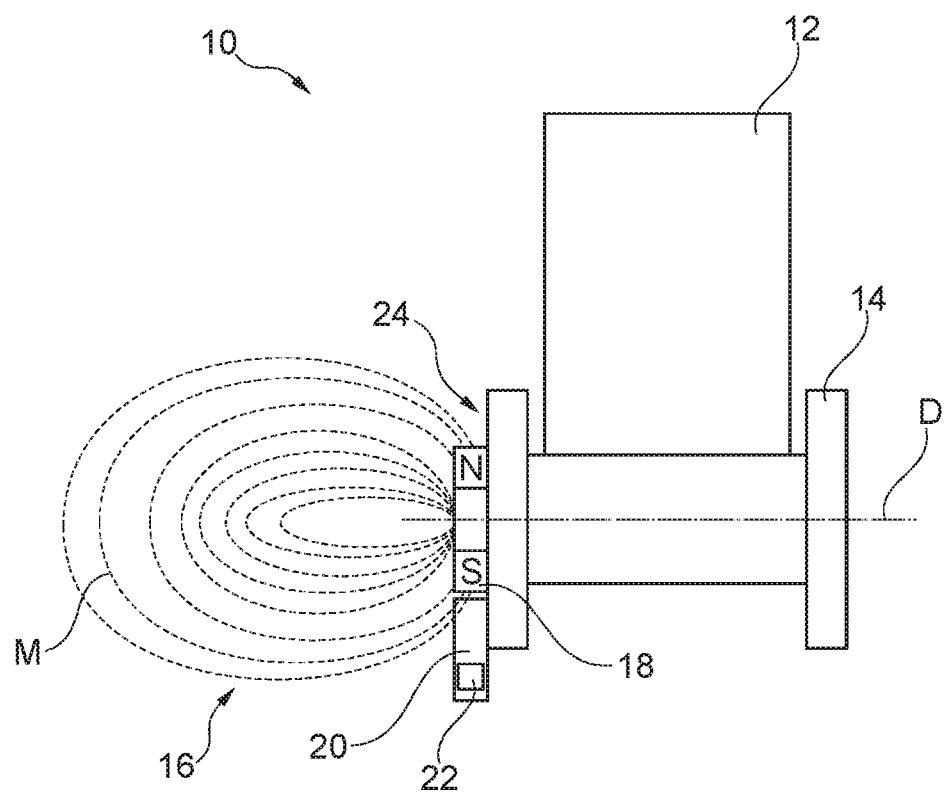
FIG. 3 shows a schematic view of a webbing retractor according to the invention as set forth in a second embodiment.
Figure 4:
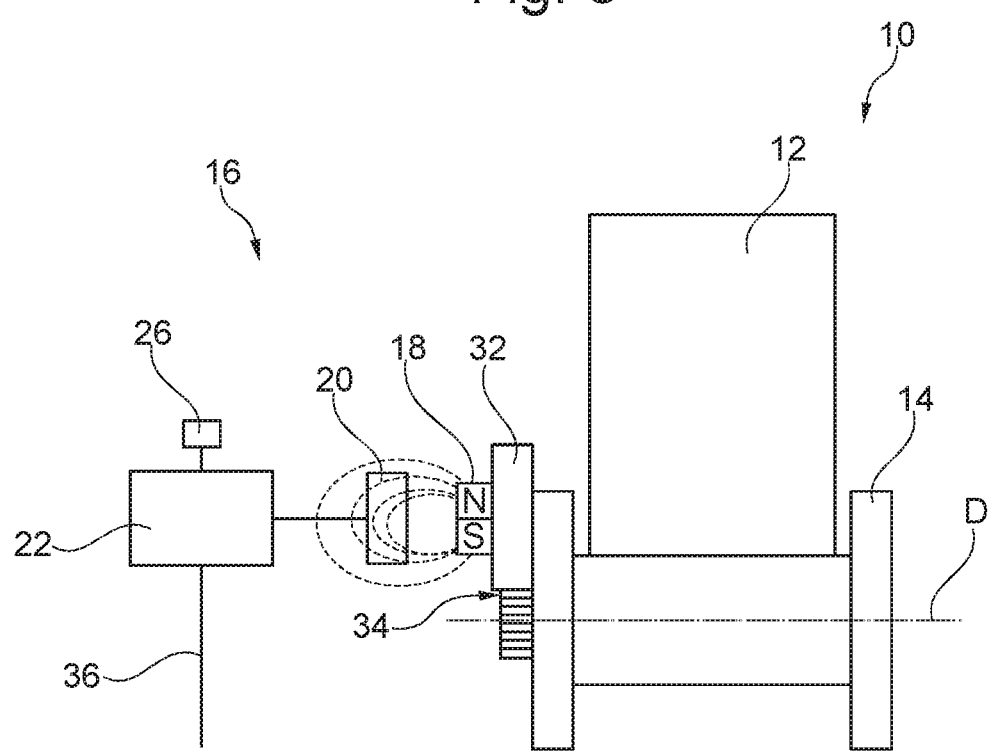
FIG. 4 shows a schematic view of a webbing retractor according to the invention as set forth in a third embodiment.
Figure 5:
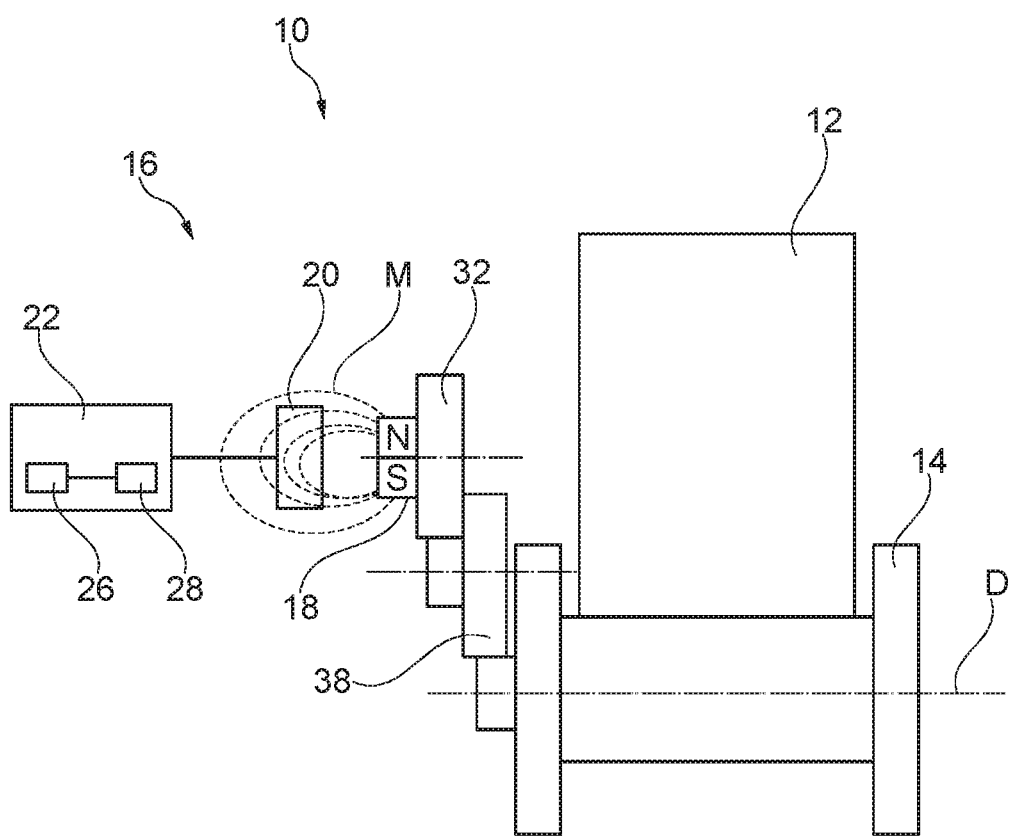
FIG. 5 shows a schematic view of a webbing retractor according to the invention as set forth in a fourth embodiment.

In FIGS. 3 to 5, further embodiments of the webbing retractor 10 are shown which substantially correspond to the first embodiment of the webbing retractor 10. Therefore, merely the differences shall be discussed and like as well as functionally equal parts are provided with like reference numerals. The functioning of the control unit, too, resembles the one described with respect to the first embodiment.

FIG. 3 illustrates a second embodiment of the webbing retractor 10.

Although, in this embodiment, the magnet 18 is provided at the front end 24 of the belt reel 14, it is not provided directly on the axis of rotation D. Rather, the magnet 18 is arranged to be offset radially outwardly on the front end 24 and may even be hollow so that it surrounds a bearing (not shown) of the belt reel 14.

The magnetic field sensor 20, too, in this embodiment is arranged to be offset against the axis of rotation D and is located at the radial outside of the magnet 18.

In addition, in the second embodiment, the control unit 22 is integrated in the magnetic field sensor 20. For reasons of clarity, the depiction of the memory 26 and the battery 28 was dispensed with in FIG. 3.

In the third embodiment of the webbing retractor 10 shown in FIG. 4, the magnet 18 is not mounted on the front end 24 of the belt reel 14. Rather, the webbing retractor 10 includes a gearwheel 32 and the belt reel 14 is provided with a toothing 34 which is in mesh with the gearwheel 32.

In this embodiment, the magnet 18 is mounted to the gearwheel 32 on the axis of rotation of the gearwheel 32.

Equally, the magnetic field sensor is provided to be aligned with the magnet 18 on the axis of rotation of the gearwheel 32.

In this third embodiment, the memory 26 is not integrated in the control unit 22 but is located outside thereof.

Moreover, the control unit 22 is not energized via a battery but is connected to the vehicle power supply via a power line 36.

The vehicle power supply supplies the power required for the stand-by mode of the control unit 22 even in the deactivated state of the vehicle.

The fourth embodiment of the webbing retractor 10 shown in FIG. 5 again shows a gearwheel 32, but the control unit 22 is configured just as in the first embodiment.

However, the webbing retractor 10 in this case includes a gear mechanism 38 provided between the belt reel 14 and the gearwheel 32 to which the magnet 18 is mounted.

The gear mechanism 38 helps to somewhat reduce the rotation of the belt reel 14 so that the rotational speed of the magnet 18 is reduced. In this way, more precise sensing is possible. However, it is not necessary to reduce the rotation of the belt reel 14 so far that the gearwheel 32 performs maximally one turn.

As a matter of course, the individual features of the shown embodiments can be combined with each other at will. In particular, the configuration of the control unit 22 is independent of the mechanical coupling between the magnet 18 and the belt reel 14.

The invention claimed is:

1. A method for sensing a webbing extension of a seat belt (12) from a webbing retractor (10) of a vehicle, wherein the webbing retractor (10) comprises a belt reel (14), at least one magnet (18) rotatable with the belt reel (14), a magnetic field sensor (20) arranged in a magnetic field generated by the magnet (18) and a control unit (22) connected to the magnetic field sensor (20), the method including the following steps:
  the position of the magnet (18) is sensed by means of the magnetic field sensor (20) by the control unit (22),
  the control unit (22) detects when the magnet (18) has completed a full turn,
  the control unit (22) deposits the number of the full turns in a memory (26), and
  the control unit (22) determines the webbing extension by way of the number of the full turns and the position of the magnet (18).

2. The method according to claim 1, wherein the control unit (22) deposits the number of the full turns in a non-volatile memory (26) and/or power is supplied to the memory (26) even in the deactivated state of the vehicle.

3. The method according to claim 1, wherein, in the deactivated state of the vehicle, the control unit (22) is operated in a stand-by mode with low power consumption in which the control unit (22) continues detecting the position of the magnet (18).

4. The method according to claim 3, wherein the control unit (22) is transferred from its stand-by mode to its operating mode when the position of the magnet (18) changes so far that a predetermined threshold is exceeded.

5. The method according to claim 3, wherein the control unit (22) is transferred from its stand-by mode to its operating mode when a predetermined action taken at the vehicle is detected, such as unlocking the vehicle, opening a vehicle door or starting an engine.

6. The method according to claim 1, wherein the value of the webbing extension is reset to zero when the control unit (22) is disconnected from a vehicle power supply.

7. The method according to claim 1, wherein the control unit (22) determines the position of the magnet (18) when the seat belt (12) is completely wound onto the belt reel (14) and deposits said position of the magnet (18) as zero position of the magnet (18) in the memory (26).

8. A webbing retractor for a seat belt (12) of a vehicle comprising a belt reel (14), at least one magnet (18), a magnetic field sensor (20) arranged in the magnetic field generated by the magnet (18) and a control unit (22) connected to the magnetic field sensor (20),
  wherein the magnet (18) is connected to the belt reel (14) so that it rotates when the belt reel (14) is rotating,
  wherein the control unit (22) is configured to carry out a method according to claim 1.

9. The webbing retractor according to claim 8, wherein the magnet (18) is mounted to a front end (24) of the belt reel (14).

10. The webbing retractor according to claim 9, wherein the magnet (18) and/or the magnetic field sensor (20) is/are arranged on an axis of rotation (D) of the belt reel (14).

11. The webbing retractor according to claim 9, wherein the magnet (18) and/or the magnetic field sensor (20) is/are arranged to be offset against an axis of rotation (D) of the belt reel (14).

12. The webbing retractor according to claim 11, wherein the magnetic field sensor (20) is arranged at a radial outside of the magnet (18).

13. The webbing retractor according to claim 8, wherein the webbing retractor (10) includes a gearwheel (32) engaged in a toothing (34) of the belt reel (14), wherein the magnet (18) is mounted on the gearwheel (32).

14. The webbing retractor according to claim 13, wherein a gear mechanism (38) is provided between the gearwheel (32) and the belt reel (14).

15. The webbing retractor according to claim 8, wherein the magnetic field sensor (20) is an AMR sensor, a GMR sensor, a CMR sensor and/or a TMR sensor.

* * * * *